United States Patent
Priest (10) Patent No.: US 11,525,651 B2
(45) Date of Patent: Dec. 13, 2022

(54) UNMANNED AERIAL VEHICLE WITH ELECTROMAGNETIC PULSE TRANSMITTER

(71) Applicant: Joshua Priest, Huntersville, NC (US)

(72) Inventor: Joshua Priest, Huntersville, NC (US)

( * ) Notice: Subject to any disclaimer, the term of this patent is extended or adjusted under 35 U.S.C. 154(b) by 314 days.

(21) Appl. No.: 16/874,769

(22) Filed: May 15, 2020

(65) Prior Publication Data
US 2021/0356237 A1 Nov. 18, 2021

(51) Int. Cl.
*B64C 39/02* (2006.01)
*F41H 13/00* (2006.01)

(52) U.S. Cl.
CPC ....... *F41H 13/0075* (2013.01); *B64C 39/024* (2013.01); *B64C 2201/121* (2013.01)

(58) Field of Classification Search
CPC .............. F41H 13/0075; B64C 39/024; B64C 2201/121
See application file for complete search history.

(56) References Cited

U.S. PATENT DOCUMENTS

| | | | | |
|---|---|---|---|---|
| 6,056,237 A * | 5/2000 | Woodland | ............. | B64C 39/024 244/49 |
| 7,338,010 B2 * | 3/2008 | Corder | .................. | B64C 39/024 244/3.28 |
| 7,584,925 B2 * | 9/2009 | Miller | ................... | B64C 39/024 244/3.28 |
| 9,211,947 B2 * | 12/2015 | Miralles | ................ | F41G 7/2253 |
| 10,118,696 B1 * | 11/2018 | Hoffberg | ............... | B64C 39/001 |
| 10,180,309 B1 | 1/2019 | Burke | | |
| 10,408,579 B1 | 9/2019 | Foltz et al. | | |
| 10,696,420 B2 * | 6/2020 | von Flotow | ........... | B65H 54/28 |
| 2005/0151009 A1 * | 7/2005 | Roeseler | ................ | B63B 35/50 244/63 |
| 2017/0225784 A1 * | 8/2017 | Hayes | ...................... | B64D 5/00 |
| 2018/0037320 A1 * | 2/2018 | Ko | ......................... | B64C 39/024 |
| 2018/0081355 A1 * | 3/2018 | Magy | .................. | G05D 1/0022 |
| 2020/0363167 A1 * | 11/2020 | Furlong | ................ | B64C 39/024 |

* cited by examiner

*Primary Examiner* — Justin M Benedik
(74) *Attorney, Agent, or Firm* — Clements Bernard Baratta; Lawrence A. Baratta, Jr.

(57) ABSTRACT

An Unmanned Aerial Vehicle is disclosed. The Unmanned Aerial Vehicle includes a body, rotors attached to the body, one or more sensors, and an electromagnetic pulse transmitter. The electromagnetic pulse transmitter is configured to transmit an EMP and the Unmanned Aerial Vehicle is configured to track a target Unmanned Aerial Vehicle using the one or more sensors and direct the electromagnetic pulse transmitter at the target Unmanned Aerial Vehicle to disrupt the target Unmanned Aerial Vehicle.

18 Claims, 4 Drawing Sheets

UNMANNED AERIAL VEHICLE WITH ELECTROMAGNETIC PULSE TRANSMITTER

FIELD OF THE DISCLOSURE

The present disclosure generally relates to Unmanned Aerial Vehicles (UAVs). More particularly, the present disclosure relates to systems and methods for using UAVs to disrupt a target UAV.

BACKGROUND OF THE DISCLOSURE

The use of UAVs in both civilian and military is expanding rapidly. Indeed, the global UAV market is expected to surpass $20 billion in the coming years. Private and commercial use of UAVs is continually expanding. Uses include filming, delivery, transport, and the like. UAVs come in various sizes from small handheld devices, to devices large enough to transport packages, and further to devices large enough to transport people.

With this expanding use, UAVs can threaten airspace, such as by interfering with other aircraft, entering restricted airspace, and the like. Indeed, UAVs have collided with airplanes, hot air balloons, and other UAVs. Furthermore, UAVs can be loaded with hazardous payloads for attacking a selected target or can be used for other malicious purposes, such as data theft, espionage, and the like.

In response to these emerging challenges with the use of UAVs, the Federal Aviation Administration (FAA) has begun regulating the use of UAVs and is requiring that most UAVs be registered before use. Furthermore, guns and cannons have been developed to disable UAVs that enter restricted airspace, such as at airports, military bases, and the like. However, a UAV that is disabled while in flight can potentially and unpredictably crash, which could injure people nearby or cause significant structural damage. This is particularly true in instances where the UAV is maliciously loaded with a hazardous payload. What is needed is a means for disrupting a UAV so as to cause the UAV to lose altitude until the UAV is safely on the ground without crashing uncontrollably to the ground.

BRIEF SUMMARY OF THE DISCLOSURE

The present disclosure generally provides a UAV with an electromagnetic pulse (EMP) transmitter. The UAV is configured to track a target UAV and direct an EMP from the EMP transmitter at the target UAV to disrupt and ground the target UAV. By disrupting, rather than disabling the target UAV, the target UAV can be grounded without crashing and potentially causing damage to nearby structures or injuring nearby people.

In one exemplary embodiment, the present disclosure provides a UAV comprising a body, rotors attached to the body, one or more sensors, and an EMP transmitter. The EMP transmitter is configured to transmit an EMP. The UAV is configured to track a target UAV using the one or more sensors and direct the EMP at the target UAV to disrupt the target UAV.

In one embodiment, the EMP is modulated based on at least one of a rate of descent of the target UAV and a distance between the UAV and the target UAV. Optionally, the UAV determines the at least one of the rate of descent of the target UAV and the distance between the UAV and the target UAV based on data acquired by the one or more sensors. And optionally, the EMP is modulated to disrupt the target UAV without disabling the target UAV at least until the target UAV is grounded.

In another embodiment, the UAV further comprises a radio frequency interference (RFI) transmitter, wherein the UAV is configured to direct RFI at the target UAV to interfere with communications directed thereto. Optionally, the UAV is configured to determine a frequency of communication being utilized by the target UAV and transmits the RFI based on the determined frequency.

In a further embodiment, the UAV is configured to follow a flight path of the target UAV until the target UAV is grounded.

In yet another embodiment, the UAV further comprises shielding positioned between an antenna of the EMP transmitter and other components of the UAV to protect the other components of the UAV from the EMP.

In another exemplary embodiment, the present disclosure provides a method for disrupting a target UAV. The method includes dispatching a UAV including an EMP transmitter configured to transmit an EMP. The method also includes tracking the target UAV with the UAV using one or more sensors of the UAV. The method further includes directing an EMP at the target UAV to disrupt the target UAV.

In one embodiment, directing an EMP at the target UAV to disrupt the target UAV includes modulating the EMP based on at least one of a rate of descent of the target UAV and a distance between the UAV and the target UAV. Optionally, the UAV determines the at least one of the rate of descent of the target UAV and the distance between the UAV and the target UAV based on data acquired by the one or more sensors. And optionally, the EMP is modulated to disrupt the target UAV without disabling the target UAV at least until the target UAV is grounded.

In another embodiment, the method further includes directing radio frequency interference (RFI) at the target UAV with an RFI transmitter of the UAV to disrupt communication to the target UAV. Optionally, the method yet further includes determining a frequency of communication being utilized by the target UAV based on data acquired by the one or more sensors and transmitting the RFI based on the determined frequency.

In a further embodiment, tracking the target UAV with the UAV includes following a flight path of the target UAV until the target UAV is grounded.

In yet a further embodiment, the UAV is configured to follow a flight path of the target UAV until the target UAV is grounded.

In still a further embodiment, the method includes attaching a tether to the target UAV.

In a further exemplary embodiment, the present disclosure provides a UAV system. The UAV system includes a UAV and a case configured to store the UAV. The UAV includes a body, rotors attached to the body, one or more sensors, and an EMP transmitter. The EMP transmitter is configured to transmit an EMP. The UAV is configured to track a target UAV using the one or more sensors and direct the EMP at the target UAV to disrupt the target UAV.

In one embodiment, the EMP is modulated based on at least one of a rate of descent of the target UAV and a distance between the UAV and the target UAV.

In another embodiment, the case comprises: an enclosure configured to hold the UAV therein; and a controller built within the case that is configured to wirelessly communicate with the UAV.

In a further embodiment, the case comprises a dock configured to hold the UAV and a strap configured to secure the dock to a person.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for disrupting a target UAV. Again, a UAV that enters restricted airspace, navigates dangerously close to other aircraft, or that includes a hazardous payload needs to be removed from the airways quickly, while maintaining safety to those nearby and while preventing collateral damage.

In embodiments, a UAV includes an electromagnetic pulse (EMP) transmitter to target and disrupt a target UAV (such as one in restricted airspace, and the like). The EMP transmitted is such that the target UAV is disrupted without being completely disabled so that the target UAV can be grounded without crashing uncontrollably.

In further embodiments, the UAV also includes radio frequency interference (RFI) transmitter for interfering with and blocking communication with the target UAV, to prevent the target UAV from receiving command signals from a controller.

By equipping a UAV with an EMP transmitter and an RFI transmitter, the UAV can track a rogue UAV, target the rogue UAV and ground the rogue UAV while minimizing collateral damage.

Figure 1:
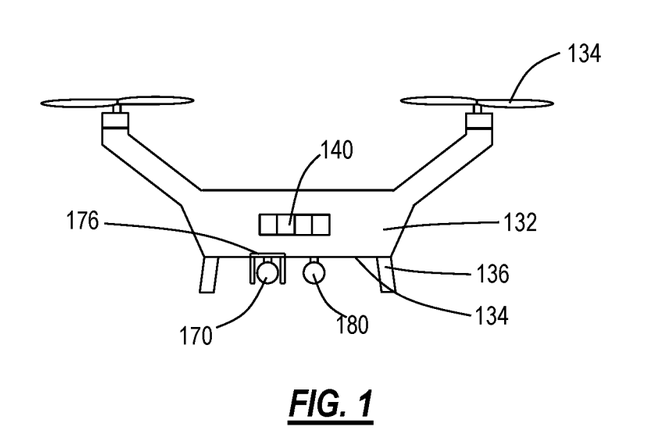
FIG. 1 is a schematic diagram of an exemplary UAV.

FIG. 1 is a schematic diagram of an exemplary UAV 130. The UAV 130 may be referred to as a drone or the like. The UAV 130 includes rotors 134 attached to a body 132. A lower frame 134 is located on a bottom portion of the body 132, which can include legs 136 for landing the UAV 130 to rest on a flat surface and absorb impact during landing. The UAV 130 also includes one or more sensors 140. The one or more sensors 140 include a camera to provide a real-time display on a screen of a controller, and the like. In embodiments, the one or more sensors 140 are configured to detect a target UAV for tracking thereof. In further embodiments, the one or more sensors 140 are also configured to detect or obtain data that is usable to determine a distance between the UAV 130 and the target UAV.

The UAV 130 includes various electronic components, described in detail below, inside the body 132 and/or the one or more sensors 140. The UAV 130 also includes an EMP transmitter 170. In the embodiment illustrated in FIG. 1, the EMP transmitter 170 is positioned at the lower frame 134 of the UAV 130 below the body 132. However, other configurations are also contemplated, such as the EMP transmitter 170 being positioned on a side or on a top panel of the UAV 130.

Figure 2:
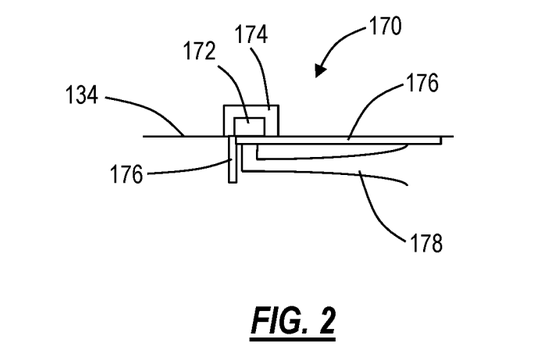
FIG. 2 is a schematic diagram of the EMP transmitter 170 of FIG. 1.

FIG. 2 is a schematic diagram of the EMP transmitter 170 of FIG. 1. Referring to FIGS. 1 and 2, the EMP transmitter 170 includes an EMP generator 172, an antenna 174, and shielding 176. In embodiments, the EMP generator 172 includes a piezoelectric generator with a pulse forming network for generating an EMP. The antenna 174 is configured to direct the EMP in a selected direction, and in particular, at a target UAV. In embodiments, the antenna 174 is a directional antenna, such as a horn antenna, configured to focus the EMP on the target and prevent interference with other nearby electronics. The shielding 176 is positioned between the antenna 174 and the other components of the UAV 130 to protect the UAV 130 and its components from the EMP. In embodiments, the EMP transmitter 170 also includes and actuator 178. The actuator 178 is configured to modify an orientation of the antenna 174 relative to the UAV 130.

Figure 3:
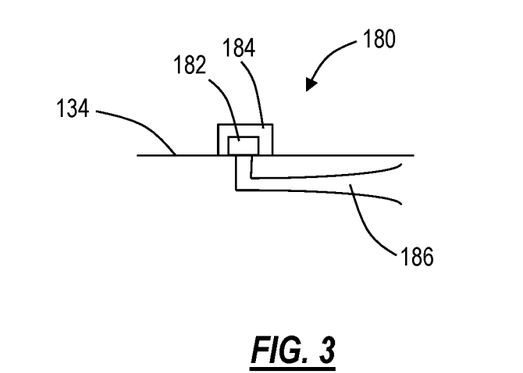
FIG. 3 is a schematic diagram of the RFI transmitter 180 of FIG. 1.

In some embodiments, the UAV 130 also includes an RFI transmitter 180. FIG. 3 is a schematic diagram of the RFI transmitter 180 of FIG. 1. Referring to FIGS. 1 and 3, the RFI transmitter 180. The RFI transmitter 180 is configured to transmit signals at the target UAV to disrupt, interfere, or otherwise block radio communication to the target UAV. In some embodiments, the one or more sensors 140 detect the control signals of the target UAV such that the RFI transmitter 180 can be controlled to transmit signals at the same frequency at the target UAV. In embodiments, the RFI transmitter 180 includes a signal generator 182, for generating the radio signal, and an antenna 184. In some embodiments, the antenna 184 is a directional antenna, such as a horn antenna, configured to focus the radio signal at the target. In some embodiments, the RFI transmitter 180 also includes an actuator 186 that is configured to modify an orientation of the antenna 184. While the actuator 186 is shown as a separate actuator from actuator 178 in FIG. 1, in some embodiments, a single actuator is used to direct both antenna 174 and antenna 184.

Figure 4:
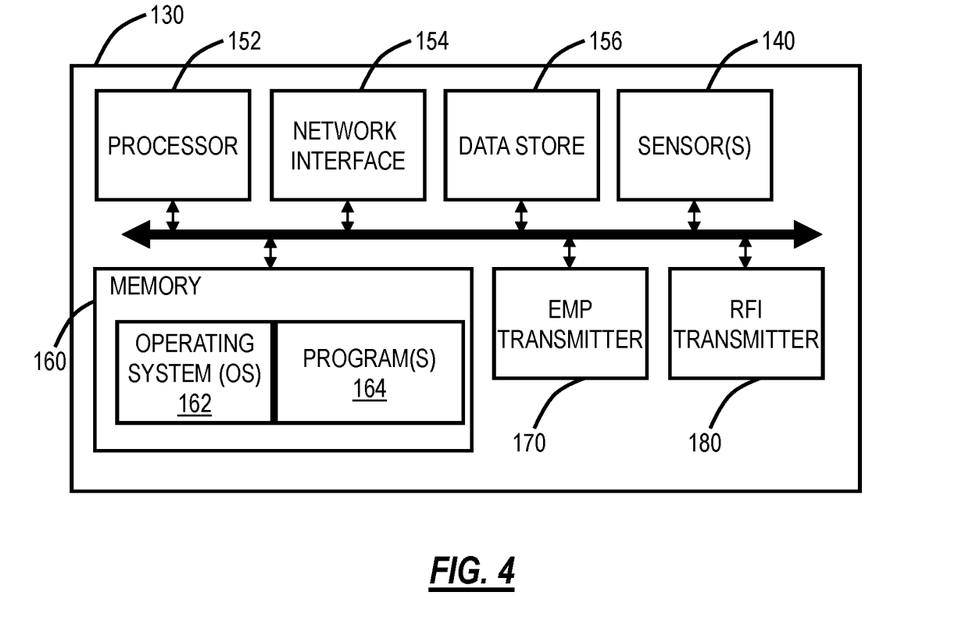
FIG. 4 is a block diagram of the UAV of FIG. 1.

FIG. 4 is a block diagram of the UAV 130 of FIG. 1. The UAV 130 includes a processor 152 which is a hardware device for executing software instructions. The processor 152 can be any custom made or commercially available processor, a central processing unit (CPU), an auxiliary processor among several processors associated with the UAV 130, a semiconductor-based microprocessor (in the form of a microchip or chip set), or generally any device for executing software instructions. When the UAV 130 is in operation, the processor 152 is configured to execute software stored within the memory 158, to communicate data to and from the memory 158, and to generally control operations of the UAV 130 pursuant to the software instructions. The UAV 130 also includes a network interface 154, a data store 156, memory 158, and the like, all of which are communicatively coupled to one another and to the processor 152.

The network interface 154 enables wireless communication with a controller directly or over a wireless network. Any number of suitable wireless data communication protocols, techniques, or methodologies can be supported by the network interface 154, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The network interface 154 can be used to relay data between the UAV 130 and a controller, and in particular, to receive control signals from the controller. The data store 156 may be used to store data. The data store 156 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The memory 160 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 160 may incorporate electronic, magnetic, optical, and/or other types of storage media. Note that the memory 160 may have a distributed architecture, where various components are situated remotely from one another but can be accessed by the processor 152. The software in memory 160 can include one or more software programs, each of which includes an ordered listing of executable instructions for implementing logical functions. In the example of FIG. 4, the software in the memory 160 includes a suitable operating system (O/S) 162 and programs 164. The operating system 162 essentially controls the execution of other computer programs and provides scheduling, input-output control, file and data management, memory management, and communication control and related services. The programs 164 may include various applications, add-ons, etc. configured to control various aspects of the UAV 130, including the EMP transmitter 170 and the RFI transmitter 180, based on control signals received from the controller and data obtained from the one or more sensors 140, and configured to perform the methods described herein.

Figure 5:
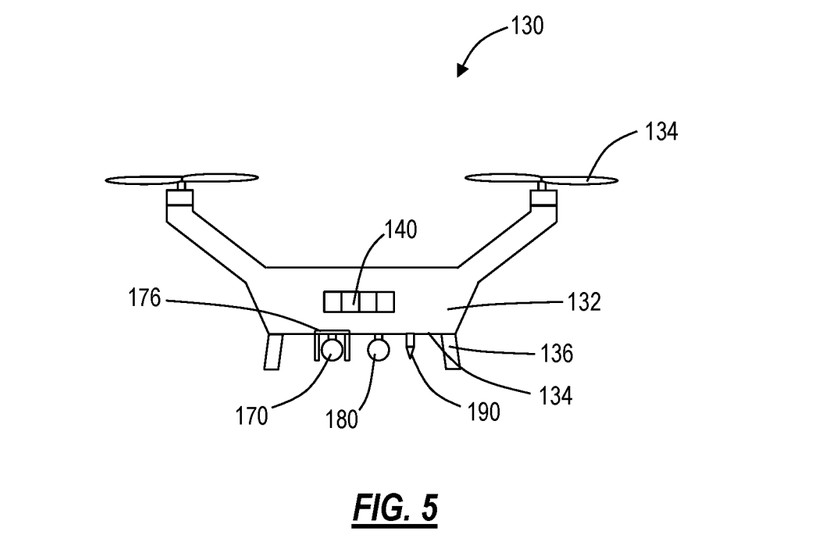
FIG. 5 is a schematic diagram of the UAV of FIG. 1 with a tether.

FIG. 5 is a schematic diagram of the UAV 130 of FIG. 1 with a tether. In some embodiments, the UAV 130 also includes a tether 190. The tether 190 is configured to attach to the target UAV such that the UAV 130 can guide the target UAV to the ground while interfering with the target UAV using the EMP transmitter 170, and in embodiments, while interfering with the target UAV using the RFI transmitter 180. The tether 190 can be a projectile connected to the body 132, such as by a cord. The projectile can include barbs, a claw, and the like for securing the projectile to the target UAV. The projectile can be propelled at the target UAV using springs, pneumatics, and the like.

Figure 6:
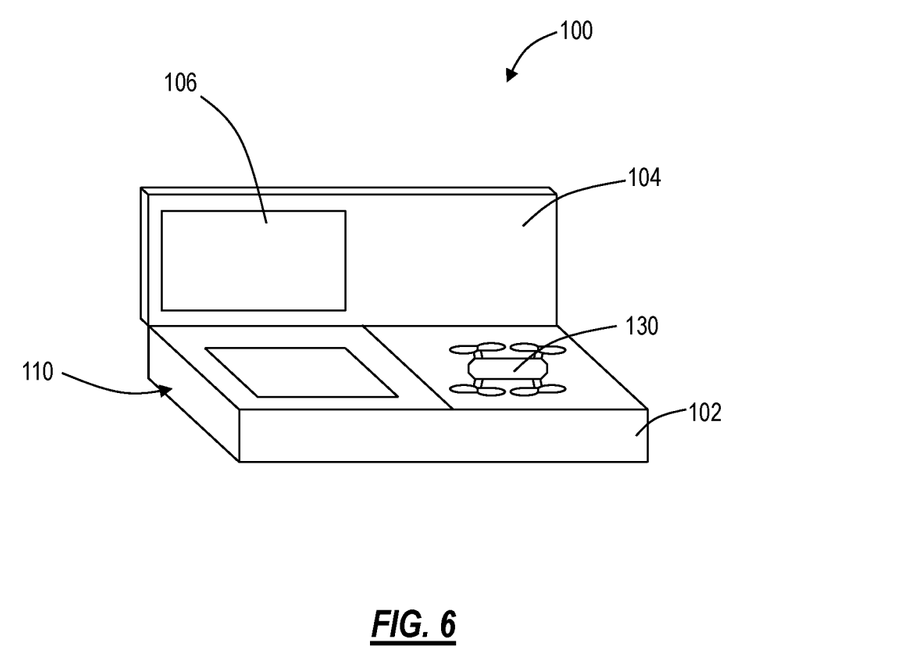
FIG. 6 is a schematic diagram of a UAV system including the UAV of FIG. 1.

FIG. 6 is a schematic diagram of a UAV system 100 including the UAV 130 of FIG. 1. In embodiments, the UAV system 100 includes a storage case 102 for the UAV 130 and a controller 110. In the embodiment illustrated in FIG. 6, the controller 110 is embedded into the storage case 102 and includes a display device 106 embedded into a top cover 104 of the case. Alternatively, the controller 110 is located remotely from the storage case 102, such as at a police precinct, an air traffic control tower, a command center, and the like. In some embodiments, the storage case 102 is configured to fit within a trunk or storage compartment of a vehicle, such as a police cruiser, and to be secured to the frame thereof. Alternatively, the storage case 102 can be positioned in a secure location, such as at a perimeter of a sensitive area (for example, an airport or military base) or at a centralized location within a city so that the UAV 130 can be quickly deployed in an emergency.

In embodiments where the case 102 is secured within a trunk of a vehicle, the controller 110 can be configured with one or more batteries and can be configured to draw power from the vehicle to ensure sufficient power for controller 110 is always available. Similarly, the storage case 102 can draw power from the vehicle to charge the UAV 130.

Various sizes of UAVs 130 are contemplated, such as UAVs 130 that require a large vehicle for transport to smaller, handheld UAVs 130. In embodiments, selection of which size of UAV 130 to use depends on the size of the target UAV. In some embodiments, the storage case 102 is configured to hold multiple UAVs 130 of various sizes configured to communicate with a single controller 110.

Figure 7:
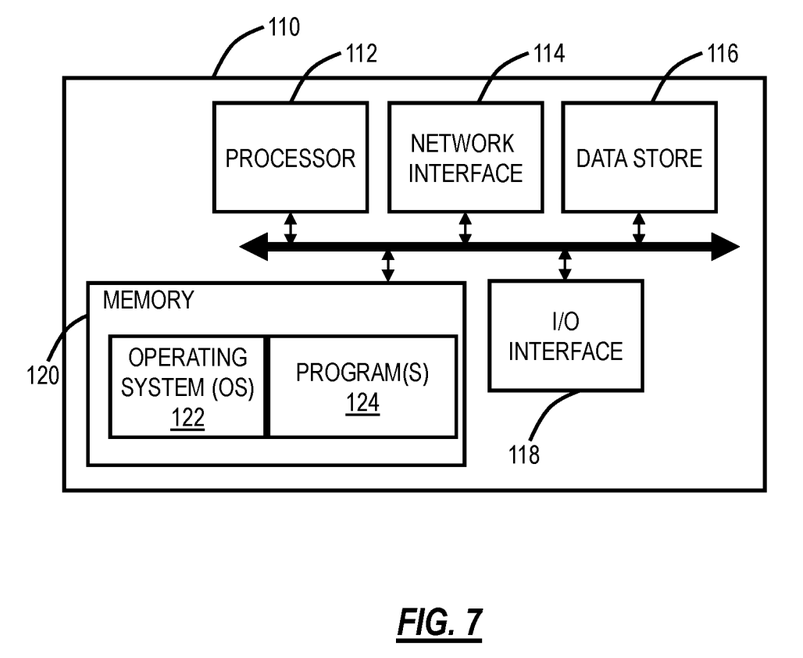
FIG. 7 is a block diagram of the controller for the UAV.

FIG. 7 is a block diagram of the controller 110 for the UAV 130. The controller 110 includes a processor 112 which is a hardware device for executing software instructions. The processor 112 can be any custom made or commercially available processor, a central processing unit (CPU), an auxiliary processor among several processors associated with the controller 110, a semiconductor-based microprocessor (in the form of a microchip or chip set), or generally any device for executing software instructions. When the controller 110 is in operation, the processor 112 is configured to execute software stored within the memory 120, to communicate data to and from the memory 120, and to generally control operations of the controller 110 pursuant to the software instructions. The UAV 130 also includes input/output (I/O) interfaces 118, a network interface 154, a data store 156, memory 158, and the like, all of which are communicatively coupled to one another and to the processor 152.

The I/O interfaces 118 can be used to receive user input from and/or for providing system output. User input can be provided via, for example, a keypad, a touch screen, a scroll ball, a scroll bar, buttons, and the like. System output can be provided via the display device 106 such as a liquid crystal display (LCD), touch screen, and the like. The I/O interfaces 118 can also include, for example, a serial port, a parallel port, a small computer system interface (SCSI), an infrared (IR) interface, a radio frequency (RF) interface, a universal serial bus (USB) interface, and the like. The I/O interfaces 112 can include a graphical user interface (GUI) that enables a user to interact with the controller 110 which enables the user to input commands to control the UAV 130.

The network interface 114 enables wireless communication with UAV 130 directly or over a wireless network for data transfer there between, and in particular, for communicating control signals from the controller 110 to the UAV 130 and to communicate sensor data from the one or more sensors 140 back to the controller 110 from the UAV 130. Any number of suitable wireless data communication protocols, techniques, or methodologies can be supported by the network interface 114, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 116 may be used to store data. The data store 116 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The memory 120 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 120 may incorporate electronic, magnetic, optical, and/or other types of storage media. Note that the memory 120 may have a distributed architecture, where various components are situated remotely from one another but can be accessed by the processor 112. The software in memory 120 can include one or more software programs, each of which includes an ordered listing of executable instructions for implementing logical functions. In the example of FIG. 6, the software in the memory 120 includes a suitable operating system (O/S) 122 and programs 124. The operating system 122 essentially controls the execution of other computer programs and provides scheduling, input-output control, file and data management, memory management, and communication control and related services. The programs 124 may include various applications, add-ons, etc. configured to provide end-user functionality with the controller 110, including performing various aspects of the systems and methods described herein.

Figure 8:
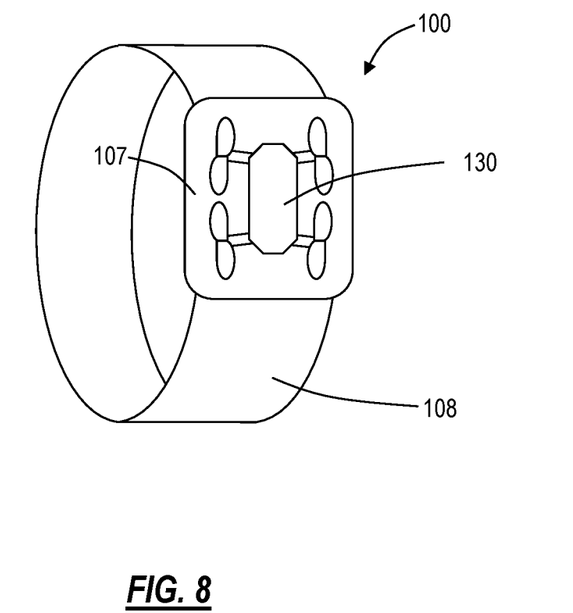
FIG. 8 is a schematic diagram of an embodiment of the UAV system of FIG. 6.

FIG. 8 is a schematic diagram of an embodiment of the UAV system 100 of FIG. 6. In the embodiment illustrated in FIG. 8, the storage case 102 includes a dock 107 and a strap 108. The dock 107 is configured to receive and hold the UAV 130 in place, while the strap 108 is configured to secure the dock 107 and UAV 130 to a person's body, such as to a wrist, arm, leg, and back of the person. In some embodiments, the controller 110 is embedded into the dock 107. Alternatively, the UAV 130 is controlled by a separate device, such as the person's cellular phone or a separate dedicated controller.

Figure 9:
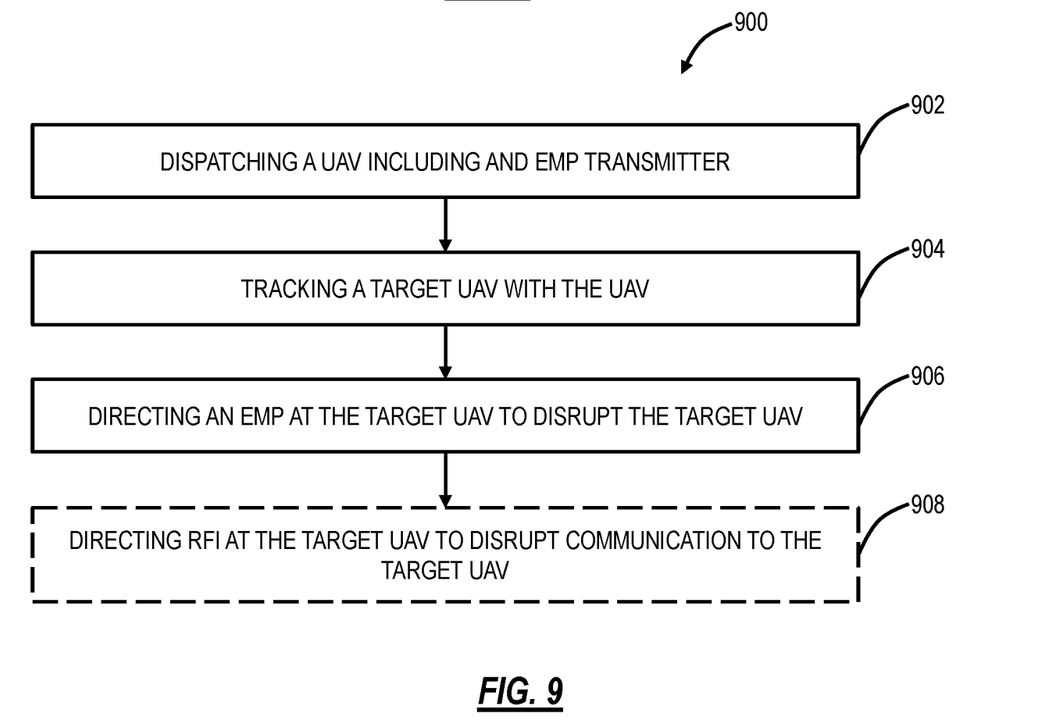
FIG. 9 is a flowchart of a method for disabling a target UAV.

FIG. 9 is a flowchart of a method 900 for disrupting a target UAV. The method 900 includes dispatching a UAV 130 including and EMP transmitter 170 at step 902. Dispatching the UAV 130 can include remotely activating the UAV 130, launching the UAV 130 from the storage case 102, launching the UAV 130 from the dock 107, and the like.

The method also includes tracking the target UAV with the UAV 130 at step 904. In embodiments, tracking the target UAV includes the UAV flying within an effective range of the EMP transmitter 170. In further embodiments, tracking the target UAV also includes mimicking a flight pattern of the target UAV.

The method further includes directing an EMP at the target UAV to disrupt the target UAV at step 906. In embodiments, the EMP is configured to interfere with the target UAV such that the rotors of the target UAV are slowed, causing the target UAV to lose altitude until the target UAV reaches the ground. By so doing, the target UAV can be removed from restricted airspace, and the like, without causing significant damage or injury. In some embodiments, the UAV 130 modulates the EMP based on one or more of a rate of descent of the target UAV and a distance between the UAV 130 and the target UAV. In embodiments, the rate of descent and/or the distance between the UAV 130 and the target UAV are determined by the UAV 130 (by processor 152) using data retrieved by the one or more sensors 140. In some embodiments, the one or more sensors 140 include lidar, and the like, for tracking the target UAV, for determining the rate of descent and the distance between the UAV 130 and the target UAV.

By modulating the EMP, the EMP reaching the target UAV can be controlled so as to control the descent of the target UAV and to ensure that the target UAV is not completely disabled (permanently or temporarily) which would cause the target UAV to drop out of the sky and crash. Further, by modulating the EMP, collateral damage and interference with surrounding electronics can be minimized. Alternatively, in emergencies, the EMP can be modulated to completely disable the target UAV. In embodiments, the EMP is modulated by one or more of wavelength, frequency, power, and the like. In embodiments, the effectiveness of the EMP on the target EMP is also controlled by modifying the distance between the UAV 130 and the target EMP.

In embodiments, directing the EMP at the target UAV includes directing the EMP using a directional antenna. In further embodiments, directing the EMP at the target UAV includes changing a direction of the antenna 178 relative to the UAV 130. In embodiments, the EMP transmitter 170 includes shielding 176 to protect the other components of the UAV 130 from the EMP.

In some embodiments, the method 900 yet further includes directing RFI at the target UAV to disrupt communication to the target UAV at step 908. The RFI can be configured to block communication to the target UAV. In embodiments, directing the RFI at the target UAV includes directing the RFI using a directional antenna. In further embodiments, directing the RFI at the target UAV includes changing a direction of the antenna 186 relative to the UAV 130. In embodiments, directing RFI at the target UAV includes monitoring the target UAV and determining which radio frequencies the target UAV is communicating over and directing RFI at the target UAV based on the radio frequencies being used by the target UAV. By tailoring the RFI based on the radio frequencies used by the target UAV, interference with nearby electronics can be minimized.

In still further embodiments, the method 900 includes attaching a tether to the target UAV. In some instances, such as when the target UAV is over water or over a crowded area, the tether can be attached to the target UV to guide the target UAV away from the water or the crowded area. Furthermore, in other instances, such as where the target UAV includes EMP shielding, the tether can be used to disable the target UAV and remove the target UAV from the sky.

In some embodiments, a user guides the UAV 130 near the target UAV and uses the controller 110 to identify the target UAV, after which, the UAV 130 autonomously tracks and targets the target UAV until the target UAV is on the ground. In some embodiments, the UAV 130 is configured to hover over the target UAV and continue to direct the EMP and RFI until the target UAV is powered down or until a control signal is received from the controller 110.

In some embodiments, the method 900 includes staging multiple UAVs 130 along a perimeter of restricted airspace, in strategic places throughout the community, and the like, and dispatching the UAV 130 includes selecting one of the multiple UAVs, causing the storage case 102 to open and launching the selected UAV 130 from the storage case 102.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An Unmanned Aerial Vehicle (UAV) comprising:
   a body;
   rotors attached to the body;
   one or more sensors; and
   an electromagnetic pulse (EMP) transmitter configured to transmit an EMP,
   wherein, the UAV is configured to track a target UAV using the one or more sensors and direct the EMP at the target UAV to disrupt the target UAV, and wherein the EMP is modulated as to control a descent of the target UAV to remove the target UAV from the sky without causing significant damage.

2. The UAV of claim 1, wherein the EMP is modulated based on at least one of a rate of descent of the target UAV and a distance between the UAV and the target UAV.

3. The UAV of claim 2, wherein the UAV determines the at least one of the rate of descent of the target UAV and the distance between the UAV and the target UAV based on data acquired by the one or more sensors.

4. The UAV of claim 1, further comprising a radio frequency interference (RFI) transmitter, wherein the UAV is configured to direct RFI at the target UAV to interfere with communications directed thereto.

5. The UAV of claim 4, wherein the UAV is configured to determine a frequency of communication being utilized by the target UAV and transmits the RFI based on the determined frequency.

6. The UAV of claim 1, wherein the UAV is configured to follow a flight path of the target UAV until the target UAV is grounded.

7. The UAV of claim 1, further comprising shielding positioned between an antenna of the EMP transmitter and other components of the UAV to protect the other components of the UAV from the EMP.

8. A method for disrupting a target Unmanned Aerial Vehicle (UAV), the method comprising:
   dispatching a UAV including an electromagnetic pulse (EMP) transmitter configured to transmit an EMP;
   tracking the target UAV with the UAV using one or more sensors of the UAV;
   directing an EMP at the target UAV to disrupt the target UAV;
   modulating the EMP as to control a descent of the target UAV to remove the target UAV from the sky without causing significant damage;
   responsive to the target UAV being grounded, hovering over the target UAV and continually directing the EMP at the target UAV.

9. The method of claim 8, wherein directing an EMP at the target UAV to disrupt the target UAV includes modulating the EMP based on at least one of a rate of descent of the target UAV and a distance between the UAV and the target UAV.

10. The method of claim 9, wherein the UAV determines the at least one of the rate of descent of the target UAV and the distance between the UAV and the target UAV based on data acquired by the one or more sensors.

11. The method of claim 8, further comprising directing radio frequency interference (RFI) at the target UAV with an RFI transmitter of the UAV to disrupt communication to the target UAV.

12. The method of claim 11, further comprising determining a frequency of communication being utilized by the target UAV based on data acquired by the one or more sensors and transmitting the RFI based on the determined frequency.

13. The method of claim 8, wherein tracking the target UAV with the UAV includes following a flight path of the target UAV until the target UAV is grounded.

14. The method of claim 8, further comprising attaching a tether to the target UAV.

15. An Unmanned Aerial Vehicle (UAV) system comprising:
   a UAV comprising:
      a body,
      rotors attached to the body,
      one or more sensors, and
      an electromagnetic pulse (EMP) transmitter configured to transmit an EMP; and a case configured to store the UAV,
wherein, the UAV is configured to track a target UAV using the one or more sensors and direct the EMP at the target UAV to disrupt the target UAV, and wherein the EMP is modulated as to control a descent of the target UAV to remove the target UAV from the sky without causing significant damage.

16. The UAV system of claim 15, wherein the EMP is modulated based on at least one of a rate of descent of the target UAV and a distance between the UAV and the target UAV.

17. The UAV system of claim 15, wherein the case comprises: an enclosure configured to hold the UAV therein; and a controller built within the case that is configured to wirelessly communicate with the UAV.

18. The UAV system of claim 15, wherein the case comprises a dock configured to hold the UAV and a strap configured to secure the dock to a person.

* * * * *